June 12, 1951 — N. A. MARROTTE — 2,556,203
PORTABLE REFACING MACHINE
Filed Jan. 5, 1946 — 3 Sheets-Sheet 1

INVENTOR
NELSON A. MARROTTE
BY *M. A. Hayes*
ATTORNEY

June 12, 1951 — N. A. MARROTTE — 2,556,203
PORTABLE REFACING MACHINE
Filed Jan. 5, 1946 — 3 Sheets-Sheet 2
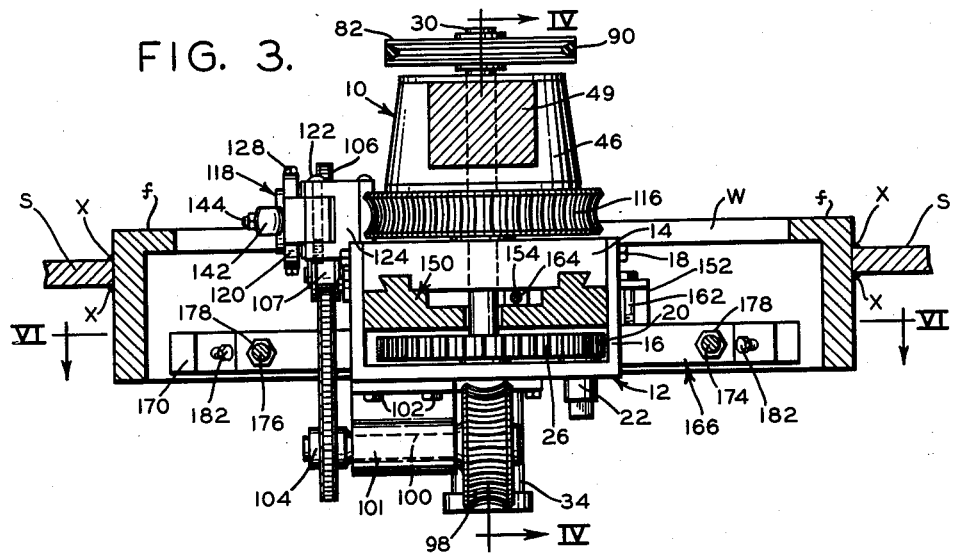
FIG. 3.
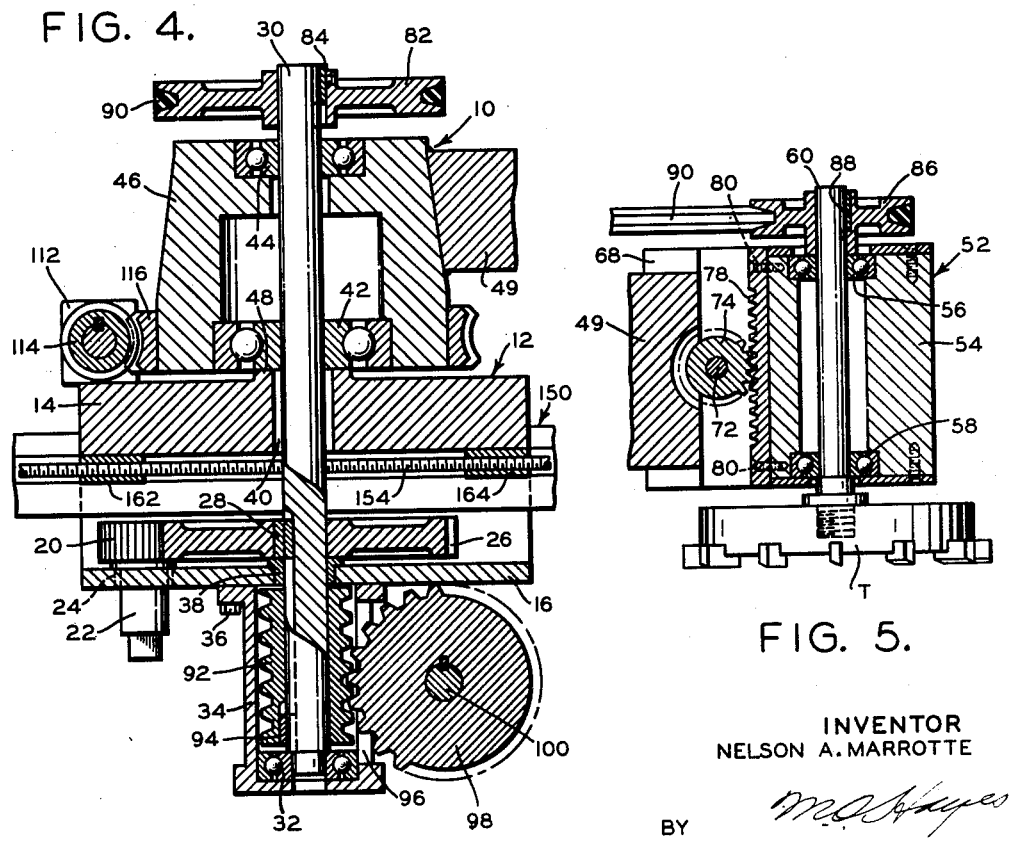
FIG. 4.
FIG. 5.
INVENTOR
NELSON A. MARROTTE
BY
ATTORNEY June 12, 1951   N. A. MARROTTE   2,556,203
PORTABLE REFACING MACHINE
Filed Jan. 5, 1946   3 Sheets-Sheet 3
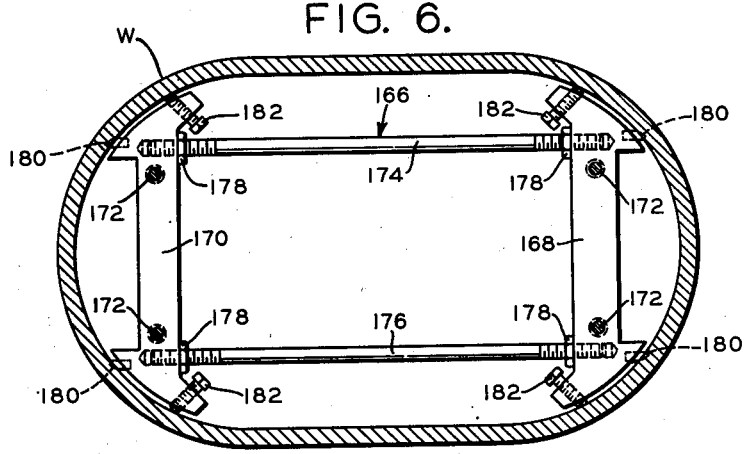
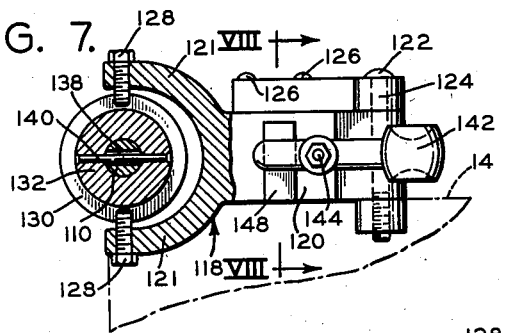
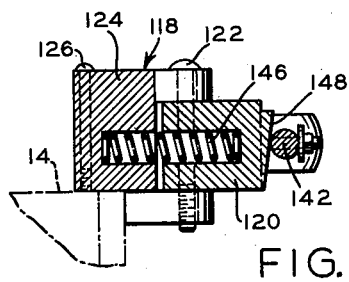
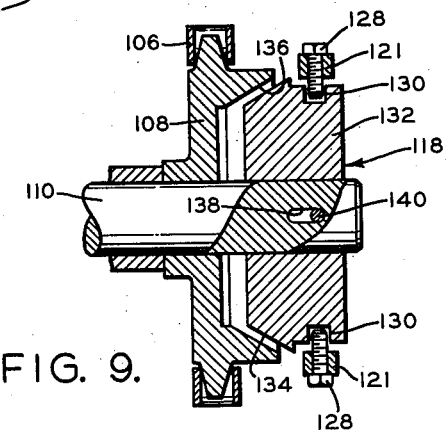
INVENTOR
NELSON A. MARROTTE
BY
ATTORNEY Patented June 12, 1951

2,556,203

UNITED STATES PATENT OFFICE 2,556,203

PORTABLE REFACING MACHINE

Nelson A. Marrotte, Dover, N. H.

Application January 5, 1946, Serial No. 639,397

1 Claim. (Cl. 90—12)

(Granted under the act of March 3, 1883, as amended April 30, 1928; 370 O. G. 757)

This invention relates to a portable refacing machine and more particularly to a device for facing flat oval surfaces, the location of which are not readily accessible for the application of ordinary tools used for this purpose.

In certain types of construction it is often necessary to reface a workpiece such as a door hatch seat which through a welding operation to a structure has become distorted. Often, the structure to which the workpiece has been welded is so bulky or unwieldly as to make it impossible to bring the workpiece to a conventional type of refacing machine to reface the distorted surface.

It is an object of the present invention, therefore, to provide a portable refacing machine which may be easily and readily adjusted to the workpiece to reface the distorted surface.

It is a further object of this invention to provide a device with means for quickly and easily adjusting the refacing tool to the surface that is to be refaced.

A further object of this invention is to provide a device that is operable within a confined location and adjustable means for regulating the depth of cut of the cutting tool during its rotation on the surface to be refaced.

A further feature resides in providing a means whereby the cutting tool can move along a flat oval surface or a plain circular surface.

These and other objects and novel features of the invention will be more clearly and fully set forth in the following specification and claim.

In the drawings forming a part of this specification:

Fig. 3 is a cross sectional view indicated by the line III—III of Fig. 2;

Fig. 4 is a cross sectional view indicated by the line IV—IV of Fig. 3;

Fig. 5 is a cross sectional view indicated by the line V—V of Fig. 1;

Fig. 6 is a cross sectional view indicated by the line VI—VI of Fig. 3;

Fig. 7 is a cross sectional view indicated by the line VII—VII of Fig. 1;

Fig. 8 is a cross sectional view indicated by the line VIII—VIII of Fig. 7; and

Fig. 9 is a cross sectional view indicated by the line IX—IX of Fig. 1.

Figure 2:
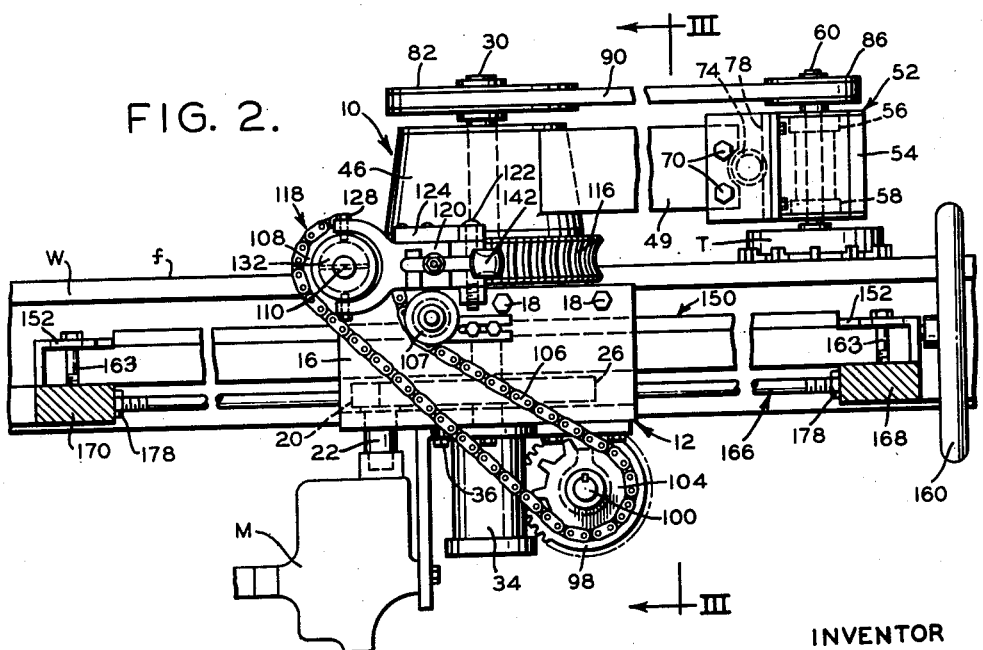
Fig. 2 is a side elevation thereof.

In Figs. 2 and 3, the device, generally indicated at 10, is shown as applied to a workpiece W. The workpiece W is illustrated as having been welded as at $x$ to the structure $s$. During the welding operation it frequently happens that the workpiece W buckles or becomes distorted in such a manner that it is necessary to reface the surface $f$.

The surface $f$ is representative of a door hatch seat or a surface that requires precise alignment to insure its proper relationship with some other element. Therefore, it is necessary to reface the surface $f$ to insure proper and true alignment. Since it is often impossible to bring the assembly to a machine where the refacing operation could be performed in the usual manner, other means for refacing the surface must be provided. It is toward the provision of these means that the present invention is directed.

As shown in Figs. 1, 2, 3 and 4, the refacing device 10 includes a carriage generally indicated at 12. The carriage 12 consists, mainly, of two parts, a top member 14 and a bottom U-shaped member 16, the member 16 being secured by screws 18 to the top member 14. The top member 14 is adapted to cooperate with a track unit later to be described. A gear 20 is keyed to a drive stub shaft 22 which shaft is journaled in a bearing 24 mounted in the bottom of U-shaped member 16. A compressed air motor M (Fig. 2) is shown attached to the drive shaft 22 as a means of rotating the shaft, but it is to be understood that any type of motor may be used for driving the shaft 22. The gear 20 meshes with a large gear 26 which is keyed, as at 28, to a vertically extending shaft 30. The lower end of shaft 30 is reduced (Fig. 4) and is journaled in a bearing 32. The bearing 32 is mounted in the lower end of a hollow cylindrical housing 34 which is secured by screws 36 to the bottom face of member 16.

The shaft 30 extends upwardly from the bearing 32 through a bearing 38 (Fig. 4) in member 16, through an aperture 40 in member 14 and through a lower and upper bearing 42 and 44 respectively. The bearings 42 and 44 are axially positioned within a frusto-conical shaped member 46.

The lower bearing 42 is adapted to ride on an upwardly extending cylindrical boss 48 formed on the top surface of member 14, thereby providing means for allowing the member 46 to rotate with respect to the carriage 12. A horizontally disposed arm 49 extends outwardly from member 46 and the outermost end of arm 49 adjustably supports a tool supporting head unit 52. The tool supporting head unit 52 (Figs. 1 and 5) comprises a housing 54 which carries a pair of axially positioned upper and lower bearings 56 and 58. A vertical shaft 60 is journaled in the bearings 56 and 58 and the lower end of the shaft is threaded so that a refacing tool T can be easily attached thereto.

The drawings illustrate a regular miller cutting tool attached to the shaft 60 but any desirable type of refacing tool may be used. The housing 54 is provided with outwardly extending flanges 62 and 64 which cooperate with guide members 66 and 68 which members are secured by screws 70 to the arm 49.

A shaft 72 is shown extending through and journaled in guide member 68. A pinion gear 74 is keyed to the inner end of shaft 72 and a knurled thumb wheel 76 is keyed to its opposite end. The pinion gear 74 meshes with a gear rack 78 (Fig. 5) which is secured by screws 80 to the housing 54. From the foregoing it will be apparent that by turning the knurled wheel 76 the housing 54 and refacing tool T may be raised or lowered with respect to the arm 49. Pulleys 82 and 86 (Figs. 4 and 5) are keyed as at 84 and 88 to shafts 30 and 60 respectively. A V-belt 90 passes around the pulleys 82 and 86 thereby providing a driving means between the vertically extending shafts 30 and 60. Any suitable drive means may be substituted for the V-belt drive herein shown and described.

Figure 1:
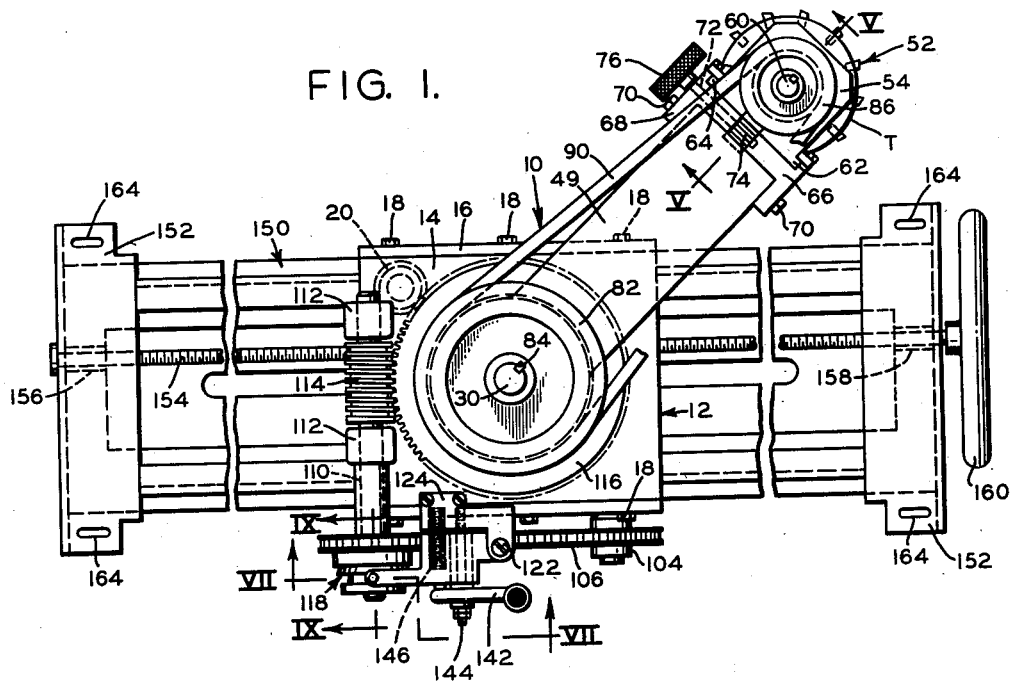
Fig. 1 is a top plan view of the portable refacing machine.

Referring now to Fig. 4, a worm gear 92 is keyed as at 94 to the lower end of shaft 30 within the housing 34. A worm wheel 98, keyed to a shaft 100, projects through an opening 96 in housing 34 and meshes with the worm gear 92. The shaft 100 is journaled in a bearing 101 (Fig. 3) which bearing is secured by screws 102 to U-shaped member 16. A sprocket gear 104 is keyed to shaft 100 (Figs. 2 and 3) and a chain drive 106 passes around sprocket gear 104 and a second sprocket gear 108. An adjustable idler pulley 107 is provided for taking the slack out of the chain drive 106. The sprocket gear 108 is freely rotatable on a horizontally disposed shaft 110 (Figs. 1 and 9) which is journaled in bearings 112 projecting upwardly from the top member 14. A worm gear 114 is keyed to shaft 110 between the bearings 112 (Fig. 1). The worm gear 114 meshes with a worm wheel ring 116 which is secured to the frusto-conical shaped member 46.

A clutch unit (Figs. 7 and 8) generally indicated at 118 is provided as a medium for controlling the rotation of shaft 110 which clutch unit will now be described in detail. This unit 118 consists of a yoke shaped member 120 pivoted at 122 to a bracket 124 which is attached to the top member 14 by screws 126. A pair of screws 128 are threaded through the arms 121 of yoke member 120 and are adapted to extend into a cylindrical recess 130 in a clutch disc 132. The disc 132 has a frusto-conical face 134 and the sprocket gear 108 is provided with a cooperating frusto-conical face 136. An elongated slot 138 is provided in the shaft 110 (Fig. 9) through which a pin 140 passes. The pin 140 is carried by and riveted to the disc 132. By this construction, the disc 132 and shaft 110 are keyed together for rotation and yet the disc may be readily moved axially along the shaft.

As shown in Figs. 1, 7, 8 and 9, an operating hand lever 142 is pivotally mounted on a shaft 144, the shaft being threaded to the bracket 124 at one end and having a washer and nut at its outer end thus providing a means of preventing the lever 142 to move outwardly with respect to the shaft 144. A spring 146 is interposed between the bracket 124 and yoke member 120, the spring 146 acting to swing the yoke member 120 about the pivot 122. However, a cam surface 148 is provided on one side of the yoke member 120 and the lever 142 engages the cam surface 148 thus limiting outward movement of the yoke member 120. From the foregoing it will be apparent that when the lever 142 is rocked in a clockwise direction about the shaft 144, the lever 142 will tend to move the yoke member 120 inwardly against the spring 146 by means of the cam surface 148. Therefore, the screws 128 will engage one side of the cylindrical recess 130 and will slide the disc 132 axially along the shaft 110 bringing the faces 134 and 136 into driving contact. Hence the disc 132 and sprocket gear 108 will act as a single unit so that rotation of the sprocket gear will drive disc 132 which in turn will rotate shaft 110 through the pin and slot connection 138—140. When the lever 142 is rocked in the opposite direction, i. e., counterclockwise, the spring 142 swings the yoke member 120 outwardly thereby causing the inclined faces 134 and 136 to become disengaged; at this stage, the sprocket gear can be rotated without causing any rotation of the shaft 110.

As shown in Figs. 2, 3 and 4, the carriage 12 is slidably mounted on a track guideway 150 having angle irons 152 attached to both ends thereof. A worm shaft 154 is journaled in bearings 156 and 158 which are carried by the track guideway 150. Keyed at one end of the shaft 154 is a hand wheel 160. The worm shaft 154 is threaded through block members 162 and 164 (Fig. 4) depending from the under face of member 14. By turning the hand wheel 160, the carriage 12 is moved along the track guideway 150. The track guideway 150 is secured by mounting bolts 163 passing through slots 164 in the angle irons 152 to an adjustable mounting unit generally indicated at 166. With reference to Figs. 3 and 6, the mounting unit 166 comprises a pair of base members 168 and 170. The base members 168 and 170 have threaded holes 172 to accommodate the mounting bolts 163. The pair of shafts 174 and 176 are threaded to the base members 168 and 170, the threads being left and right handed threads so that by turning the shafts 174 and 176 the mounting unit may be lengthened or shortened, locking nuts 178 are provided to lock the shafts after being adjusted to the correct position within the workpiece W. A pair of hardened points 180 project from each base member 168 and 170 which are provided as a means of securely locking the mounting unit 166 to the workpiece W. Set screws 182 are also provided in each base member 168 and 170 to assist in the mounting of the unit 166. From the foregoing it is seen that the mounting unit 166 may be securely fastened in place to the workpiece W and the track guideway 150 readily attached to the mounting unit.

In operation, the mounting unit 166 is secured in place to the workpiece W as described in the foregoing. Following the track guideway 150 is secured to the mounting unit 166 by the four bolts 163. Next the tool T is adjusted with respect to surface f which is to be refaced and the motor M (Fig. 2) which is attached to the drive stub shaft 22 is started. The gear 20 will drive gear 26 which will rotate shaft 30, worm gear 92 and the V-belt pulley 82. The V-belt 90 rotates pulley 86 which in turn rotates shaft 60 and the refacing tool T. As shown in Fig. 6, the device 10 can be used for refacing surfaces which are of a flat oval outline. That is, a workpiece W having straight parallel sides and semi-circular ends. By turning the handwheel 160 the carriage 12 is moved along the track guideway 150, thus moving the refacing tool T along one straight side of the workpiece W. When the tool T approaches one of the semi-circular ends of the workpiece W, rotation of the handwheel 160 is stopped and hand lever 142 is rocked downward, or in a clockwise direction, thus engaging the clutch unit 118. Since the shaft 30 is being rotated through gears 20 and 26 the worm gear 92 is likewise being rotated. Such rotation drives worm wheel 98, sprocket gear 104, chain 106 and sprocket gear 108. Since the clutch has been engaged the shaft 110 will be rotated through the medium of the clutch disc 132 and pin 140. Therefore, worm gear 114 will rotate to drive the worm wheel ring 116 causing the arm 49 to be swung in an arc about the shaft 30. When the refacing tool T has completely traveled around the semi-circular end of the workpiece W the clutch unit 118 is disengaged by moving the hand lever 142 upwardly or in a counter-clockwise direction, thus stopping the rotation of shaft 110 and worm gear 114. Next, the handwheel 160 is again turned but in an opposite direction to that in which it has just previously been rotated, to move the refacing tool T along the other straight side of the workpiece W until the opposite semi-circular end is reached whereupon the clutch unit 118 is again engaged to move the refacing tool around the semi-circular end, thereby completing the movement of the refacing tool T along the entire flat oval face of workpiece W. The above procedure can be repeated and the tool T adjusted vertically until the desired refacing job is accomplished.

The invention described herein may be manufactured and used by or for the Government of the United States of America for government purposes without the payment of any royalty thereon or therefor.

Having described my invention, what I claim as novel and desire to protect by Letters Patent of the United States is:

A portable machine for resurfacing the area surrounding an opening comprising an adjustable mounting unit adapted to be secured within said opening, a stationary guide track detachably secured to said mounting unit, a carriage slidably mounted on said track, a worm shaft journaled in bearings carried by said guide track and threadably engaging a portion of said carriage, means for rotating said worm shaft to move said carriage along said guide track, a tool supporting structure including a supporting arm and means pivotally supporting said arm on said carriage whereby said arm is rotatable about an axis perpendicular to said guide track, a worm and worm wheel mechanically associated with said pivotally supporting means providing means for rotating said arm about said axis, a driving means, a clutch engageable to couple said driving means to said worm, a tool supporting head carried by said arm at a point removed from said point of pivotal support, a cutting tool mounted in said supporting head and rotatable about a second axis parallel to said first mentioned axis, means for adjusting the position of said tool in a direction parallel to said second axis and means for rotating said tool about said second axis.

NELSON A. MARROTTE.

REFERENCES CITED

The following references are of record in the file of this patent:

UNITED STATES PATENTS

| Number | Name | Date |
| --- | --- | --- |
| 1,460,525 | Wickland | July 3, 1923 |
| 2,116,248 | Moser | May 3, 1938 |